(12) United States Patent
Call et al.

(10) Patent No.: US 9,460,288 B2
(45) Date of Patent: Oct. 4, 2016

(54) SECURE APP UPDATE SERVER AND SECURE APPLICATION PROGRAMMING INTERFACE ("API") SERVER

(71) Applicant: Shape Security, Inc., Palo Alto, CA (US)

(72) Inventors: Justin D. Call, Mountain View, CA (US); Marc Hansen, Mountain View, CA (US)

(73) Assignee: SHAPE SECURITY, INC., Palo Alto, CA (US)

( * ) Notice: Subject to any disclaimer, the term of this patent is extended or adjusted under 35 U.S.C. 154(b) by 46 days.

(21) Appl. No.: 14/563,336

(22) Filed: Dec. 8, 2014

(65) Prior Publication Data
US 2016/0162688 A1    Jun. 9, 2016

(51) Int. Cl.
| | |
|---|---|
| G06F 21/57 | (2013.01) |
| H04L 29/08 | (2006.01) |
| G06F 21/14 | (2013.01) |
| H04W 4/00 | (2009.01) |
| H04W 12/12 | (2009.01) |

(52) U.S. Cl.
CPC .............. *G06F 21/57* (2013.01); *G06F 21/14* (2013.01); *H04W 4/001* (2013.01); *H04W 4/003* (2013.01); *H04W 12/12* (2013.01); *G06F 2221/033* (2013.01); *G06F 2221/0724* (2013.01)

(58) Field of Classification Search
CPC .............. H04L 63/14; H04L 63/1441; H04L 63/1466; H04L 63/1475; H04L 67/00; H04L 67/025; H04L 67/10; H04L 67/132; H04L 67/327; G06F 17/30864; G06F 21/10; G06F 21/12; G06F 21/305; G06F 21/55; G06Q 10/00

USPC .......................................................... 726/22
See application file for complete search history.

(56) References Cited

U.S. PATENT DOCUMENTS

| | | | |
|---|---|---|---|
| 7,603,706 B2 | 10/2009 | Donnelly et al. | |
| 7,945,952 B1 | 5/2011 | Behforooz | |
| 8,261,071 B2 | 9/2012 | Buch et al. | |
| 8,316,310 B2 | 11/2012 | Champion et al. | |
| 8,495,727 B2 | 7/2013 | Ramanathan et al. | |

(Continued)

OTHER PUBLICATIONS

International Search Report and Written Opinion in International Patent Application No. PCT/US2015/063811, mailed Feb. 4, 2016, 8 pages.

*Primary Examiner* — Baotran N To
(74) *Attorney, Agent, or Firm* — Davis Wright Tremaine LLP; Philip H. Albert (57) ABSTRACT

A coupled set of servers in a server system protect an application programming interface ("API") from unwanted automation facilitated by unauthorized reverse engineering of an endpoint app or communications channel used by the endpoint app. The server system comprises at least one secure app update server that transforms an app code object received from an enterprise app server into a transferred app code object, and at least one secure application programming interface ("API") server that interacts with an endpoint device that executes the transformed app code object. The secure API is adapted to convert API requests made by the transformed app code object into renormalized API requests formatted for processing by an enterprise API server. The transforming of the app code object results in API requests from the client that would constitute invalid API requests if presented to the enterprise API server without renormalization.

20 Claims, 5 Drawing Sheets

(56) References Cited

U.S. PATENT DOCUMENTS

| | | |
|---|---|---|
| 8,590,058 B2 | 11/2013 | Fisk et al. |
| 8,793,778 B2 | 7/2014 | Marinov et al. |
| 8,850,200 B1 | 9/2014 | Horgan |
| 9,008,620 B2 | 4/2015 | Ho et al. |
| 9,294,502 B1 | 3/2016 | Benishti |
| 2004/0024610 A1 | 2/2004 | Fradkov et al. |
| 2008/0109657 A1 | 5/2008 | Bajaj et al. |
| 2009/0003539 A1 | 1/2009 | Baird et al. |
| 2009/0187986 A1 | 7/2009 | Ozeki |
| 2010/0287229 A1 | 11/2010 | Hauser |
| 2011/0023088 A1 | 1/2011 | Ko et al. |
| 2012/0011262 A1 | 1/2012 | Cheng et al. |
| 2012/0090028 A1 | 4/2012 | Lapsley et al. |
| 2012/0167204 A1 | 6/2012 | Akka |
| 2012/0323700 A1 | 12/2012 | Aleksandrovich et al. |
| 2013/0086669 A1 | 4/2013 | Sondhi et al. |
| 2014/0007048 A1 | 1/2014 | Qureshi et al. |
| 2014/0089786 A1 | 3/2014 | Hashmi et al. |
| 2014/0283038 A1 | 9/2014 | Call et al. |
| 2014/0283068 A1 | 9/2014 | Call et al. |
| 2014/0373139 A1 | 12/2014 | Fu et al. |
| 2015/0381376 A1 | 12/2015 | Wardman et al. |
| 2016/0080493 A1* | 3/2016 | Roth .................. H04L 67/1097 709/203 |

\* cited by examiner

SECURE APP UPDATE SERVER AND SECURE APPLICATION PROGRAMMING INTERFACE ("API") SERVER

FIELD OF THE INVENTION

The present invention relates generally to network computer system security and more particularly to defense against some attacks on the network computer system.

BACKGROUND

The Internet (and related networks) can be used to send e-mails, conduct business, automate machinery and perform data processing. Connected users can use the Internet to interact with other connected users and/or connected computer systems. While one user might intend to communicate with another user over the Internet, there might be a third party listening in on, or interfering with, the communication without knowledge and/or authorization of the users. A third party might also attempt to perform unauthorized operations over the Internet, such as accessing network resources in ways unintended by the provider of those network resources. Network computer security deals with making it more difficult for unauthorized third parties to understand or interfere with such communications and/or secure operations that involve such communications.

Consider, for example, a client-server system wherein an application involves client software interacting with server software. That client-server system can be made secure by requiring that the client software, the server software and the network between them remain within a closed, secure system. However, this is impractical for many applications, such as where the client and server are separated by a network that can be accessed by unauthorized third parties.

As used herein, operations are deemed "authorized" and "unauthorized" based on what the developer or supplier of a program performing those operations determines is authorized. Users are deemed "authorized" and "unauthorized" based on who a service provider determines is authorized for what. For example, using an online banking app to view one's own bank balance might be considered an authorized operation by an authorized user, whereas automating thousands transfers of small amounts of money from accounts of others or gathering personal data from accounts of others might be an unauthorized operation in the eyes of the developer of the online banking app and such a user might be considered, in the eyes the bank maintaining those accounts, an unauthorized user.

An insecure network can be addressed by securing the client, securing the server, and encrypting all traffic between the two. However, that is impractical in situations where the client is widely and publicly disseminated. For example, a popular mobile app might be made available to millions of potential users. At least some of those potential users might use their access to the client software to access the server in unauthorized ways, perhaps reverse engineering the application programming interface ("API") that the client uses to interact with the server and then writing an unauthorized version of the client that performs operations not intended by the provider of the client-server system.

All API interactions between the client and the server might be encrypted in a way that obscures operations that occur between the client and the server, but if an endpoint app is compromised or replicated, the encryption does not prevent attacks that use such endpoint app.

Security of a network resource is often considered sufficient even if it is not impossible to breach, if the effort required to mount an attack on that network resource is raised high enough so that it is uneconomical to attack while being easy enough for authorized users to access. Therefore, absolute security is not necessary in many cases, and it is sufficient to increase the efforts/costs of access to the network resource in a way that makes it uneconomical for an organization to mount an attack on those network resources, while allowing authorized uses.

But one example of a client-server system is where a user has a device that runs a web client (such as an Internet browser), that web client communicates with a web server using the Hypertext Transport Protocol ("HTTP") over the Internet. The web client might make a specific request of the web server by sending that web server a structured HTTP request and the web server might respond with an HTTP response comprising a Hypertext Markup Language ("HTML") document, which the web client then "renders" to form a displayable form of the HTML document (e.g., a web page) viewable by the user of the web client (or the device executing a software web client). Other applicable protocols might include API calls that use HTTPS, JavaScript™, CSS, XML, JSON, or other forms of web traffic or web content.

Whether an API is explicitly provided for, or an implicit API results from the structured nature of HTML documents, authorized and unauthorized users can run machine-to-machine automated operations. Even with ways to secure an API, an unauthorized third party might still be able to reverse engineer an app and build an array of attacking "bots" that run compromised versions of the app. This bot array might allow the unauthorized third party to perform unauthorized operations. It would be desirable to make reverse engineering of an app more difficult, preferably without requiring extensive, continual modification to the app or its interfaces.

SUMMARY OF THE EMBODIMENTS

A coupled set of servers in a server system protect an application programming interface ("API") from unwanted automation facilitated by unauthorized reverse engineering of an endpoint app or communications channel used by the endpoint app. The server system comprises at least one secure app update server that transforms an app code object received from an enterprise app server into a transformed app code object, and at least one secure application programming interface ("API") server that interacts with an endpoint device that executes the transformed app code object. The secure API server is adapted to convert API requests made by the transformed app code object into renormalized API requests formatted for processing by an enterprise API server. The transforming of the app code object results in API requests from the client that would constitute invalid API requests if presented to the enterprise API server without renormalization, among other possible transformations.

Where a first channel between an enterprise app server and a secure update app server is more secure and/or less accessible than a second channel between a secure update app server and endpoint devices, and third channel between the endpoint devices and the secure API server is less secure and/or more accessible than a fourth channel between the secure API server and an enterprise API server, access to the workings and understanding of API protocols can be reduced by using a secure app update server and a secure API server.

The following detailed description together with the accompanying drawings will provide a better understanding of the nature and advantages of the present invention.

In the figures, like reference symbols in the various drawings indicate like elements, and multiple instances of objects might be denoted parenthetically (e.g., 101(1), 101(2), ..., 101(n)). Where numbered objects in figures are shown with parenthetical sub-numbers ranging from 0 or 1 up to some letter designation (e.g., "1, 2, ..., k" or 1, 2, ..., n"), it should be understood that the letter designation represents some finite number the value of which is not essential for the understanding of the invention, unless otherwise indicated.

DETAILED DESCRIPTION

In the following description various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Some programs are distributed that perform machine-to-machine automated tasks using an application programming interface ("API"), wherein the programs make API calls to an API server, and the API server returns API responses to the programs or makes some actions occur. APIs can provide rich functionality, but might be easily reverse engineered and abused to malicious ends.

In a very specific example, suppose a mobile smartphone app is distributed by an enterprise and is readily obtainable, by authorized users as well as unauthorized users, from an enterprise app server. Suppose further that the mobile smartphone app can be used to interface with an enterprise API server over a communication path that users (authorized as well as unauthorized) can monitor and possibly modify. Often, by using the mobile smartphone app for a sufficiently long time, one could reverse engineer the API and then create an alternate version of the mobile smartphone app that behaves, to the API server, like the original mobile smartphone app. This would be undesirable, at least because it would provide for unauthorized API calls to the API server, e.g., API calls that were not intended by the developer of the original mobile smartphone app and that may introduce security concerns.

That undesirable situation can be avoided by having the developer of the mobile smartphone app modify the operation of the mobile smartphone app frequently, such as more frequently than a time period over which reverse engineering might be completed. This also would require frequent corresponding modifications to the API server. Updates can be created and pushed/published/made available to endpoint devices on a periodic basis, where the update period is less than the time period over which reverse engineering might be completed. In effect, permutations can occur faster than attackers can evolve their attacks.

While this might solve one problem, it creates many others, such as needing frequent modifications to the mobile smartphone app, needing those modifications to not create new bugs in the operation of the mobile smartphone app, getting authorized users updated, and frequently modifying the API server to account for the modifications to the mobile smartphone app. This might not be possible where, for example, portions of the API or the API server are not fully documented or changeable.

To avoid this, two servers (referred to herein as a secure app update server and a secure API server) are coupled to work together to secure APIs. In the examples described herein, the APIs might be mobile APIs, or other APIs. As used herein, "API" can refer to an application programming interface that is a single API, a set of APIs, a subset of one or more APIs, or other collection of API calls and functions deemed desirable for protection.

By using a secure app update server between the enterprise app server used by the distributor of the mobile smartphone app and the smartphone itself, and by using a secure API server between the mobile smartphone app and the API server, the code that the smartphone runs can be changed more frequently than changes in the functionality of the mobile smartphone app or the operation of the API. This can make it much more difficult to reverse engineer the mobile smartphone app or develop a malicious or otherwise unauthorized app that interfaces to the API server.

In a more general case, the system is used for more than just mobile smartphone apps and can be used for other endpoint apps, such as desktop computer apps, non-phone device apps, embedded apps, etc. Herein, "endpoint device" is used to refer to a computing and/or communication device that runs an endpoint app that is to be protected by systems described herein and "endpoint app" refers to the program, code, etc. being protected.

With coordination between the secure app update server and the secure API server, the system can be made such that changes are not needed in the API server or in the app as originally distributed by an enterprise app server, in effect adding a secure anti-tampering layer on top of the API calls the app normally makes. The secure API server in effect "decodes" the protected API calls before passing them along to the enterprise API server. This allows the enterprise app server and the enterprise API server to run unmodified. By having the secure app update server automate the transformation, it can change the transformed app code objects more frequently than app code objects are changed.

The secure app update server is provided the latest version of an enterprise's app, such as a mobile application, in compiled binary form, uncompiled source form, or other form. The secure app update server might be provided the latest version of the app automatically, or upon request or otherwise able to access the latest version or is passed the latest version. It may be that the app code object provided to the secure app update server is provided in uncompiled form and is compiled, along with security counter-measures, for service to endpoint devices.

As used herein, the "enterprise" can be a person, computing platform, business entity, other entity, group, etc. that offers one or more apps, wherein the apps are designed to be executed by endpoint devices and make API requests to an enterprise API server also operated by or for the enterprise. The enterprise app server and the enterprise API might be run by different entities or enterprises. The offered apps might comprise code written for the enterprise and/or code written by a separate developer and distributed by the enterprise.

Network resources might include information, financial value, computing resources, or the like. As just some examples, online-stored e-mails, online-stored personal photo albums, bank accounts with online transfer capability, online shopping services, computing power, etc., are all forms of network resources.

Network services might include uploading data, downloading data, interacting with server-side programs over a network, access to physical resources (e.g., printers, cameras, other equipment, etc.), communication services, or similar services that might be provided over a network. Network services might be provided by an HTTP server coupled to a back-end data processing system, or the like. Other network protocols might be used, as appropriate.

The network can be the Internet, an intranet, an extranet, a local-area network ("LAN"), a wide-area network ("WAN") or similar network that connects computers/devices/systems at network nodes to at least some other network nodes, thereby allowing users to use the network services. In some networks, data is sent from a source node to a destination node and it gets there reliably and error-free. In other networks, the device or computer at the source node may push data into the network directed towards the destination node and it might not get there, or might take a circuitous route to get there. Unless otherwise indicated herein, sending data from a source to a destination over the network can refer to sending directly via some operation taken at the source, sending data from the source into the network toward the destination, sending data from the source into the network carrying an address of the destination, or the like.

As used herein, at least for the sake of readability, participants in a transaction might be referred to as a "user" and a "network service provider" but it should be understood that these labels might sometimes refer to humans or computers as users and/or persons, and refer to business groups, organizations, etc. as network service providers, even though specifically and technically it may well be that an electronic device operated by, or at the behest of, a user is what is doing the interaction and the interaction is with computer/electronic hardware operated by, or at the behest of, a network service provider.

Electronic user devices might include computers, tablets, wearable computer devices, smartphones, embedded computer systems, or other devices.

Also, for the sake of readability, explanations are provided in the context of a user/user device running an "app" that interacts over the network with a server where the app and the server are coordinated such that the way the app interacts with the server is at least familiar to the server and vice versa. Unless otherwise indicated, the app can be a program running at the user device in user space, in system space, in browser space, etc. and can be a simple or complex program with a general or specific purpose. Thus, the "app" designation herein is not, unless otherwise indicated, limited to specific types of programs.

Most often, network resources are constrained so access to those network resources should be limited to those users and user devices that are authorized to access those resources and mechanisms would be used to block unauthorized access to those resources, or at least thwart unauthorized access enough to make it uninteresting to those persons or organizations that would attempt unauthorized access. Common examples of network resources that are constrained might include a messaging (e-mail, text, etc.) server that sends, stores, retrieves messages, some of which are not intended for general viewing, or an online banking application that might provide access to confidential financial information and the ability to transfer funds or obligate an account owner in some way.

Figure 1:
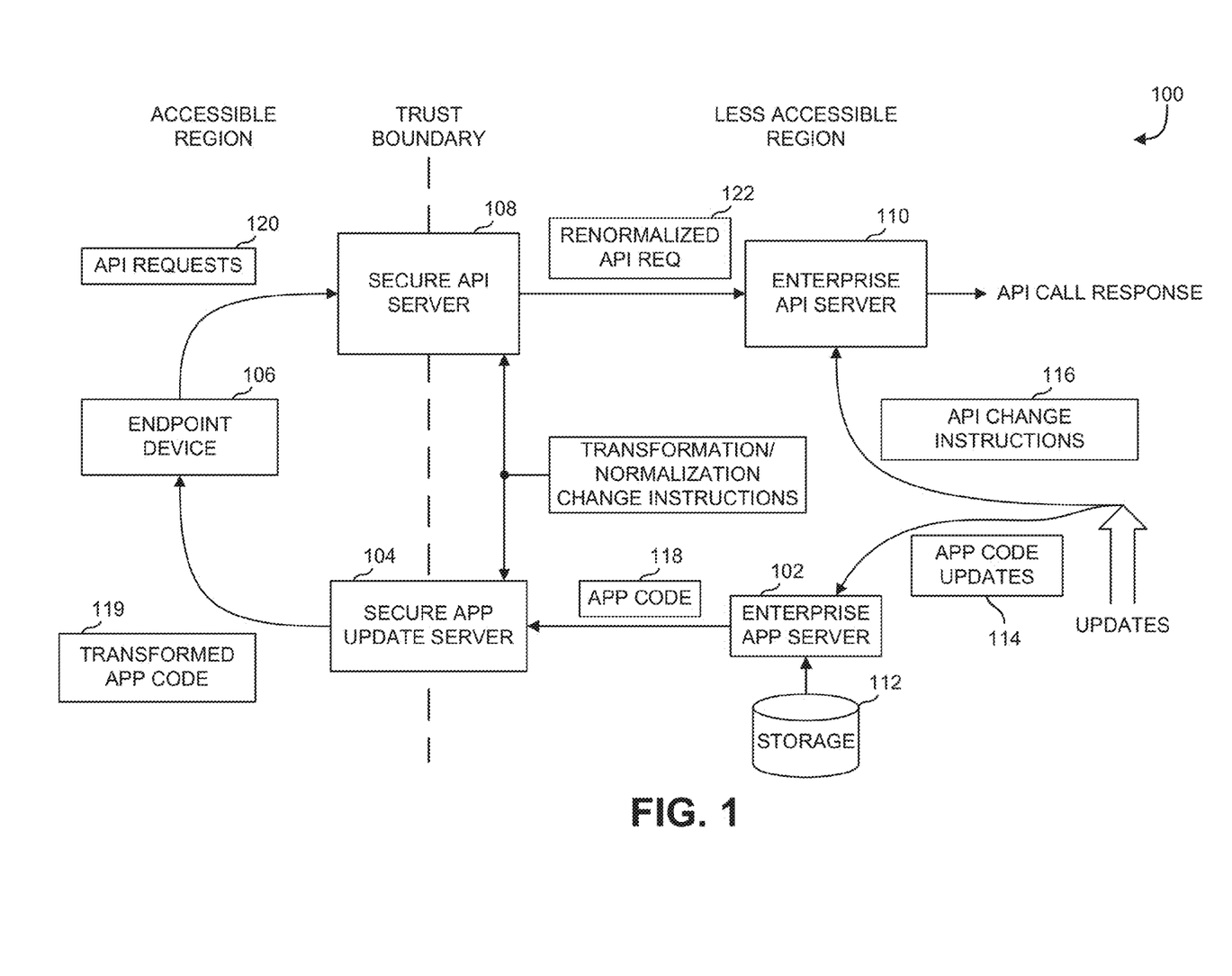
FIG. 1 is a block diagram of a network security system that can be used to protect an enterprise system from attacks based on altered or compromised endpoint devices.

FIG. 1 is a block diagram of a network security system 100 that can be used to protect an enterprise system from attacks based on altered or compromised endpoint devices. The block diagram of network security system 100 includes an enterprise app server 102, a secure app update server 104, an endpoint device 106, a secure API server 108, an enterprise API server 110, and storage 112. Also shown are various data objects passed among those elements.

Enterprise app server 102 serves copies of an app upon request. It may be that enterprise app server 102 operates in exactly the same way when a secure app update server is present as when one is not present.

Enterprise app server 102 might be coupled secure app update server 104 over a network. Different endpoint devices might be coupled to secure app update server 104 over the same network or different networks. Typically, the network between secure app update server 104 and endpoint device 106 is easily accessed by the general public having a suitable device, so that a variety of users can run the requested app on their respective endpoint devices. Where not all of the users are trusted and verified, that network between secure app update server 104 and endpoint device 106 can thus be relatively unsecure. Preferably, but not required, the network path between enterprise app server 102 and secure app update server 104 is less accessible than the network paths to and from endpoint device 106.

When an app is written, it might be compiled or otherwise processed to form an app program object. Examples of app program objects include executable program code, an executable file, a JavaScript™ file, a script, and/or object code. That app program object might be represented by digital data that can be understood by a processor that would execute the instructions of the app program object or by digital data that can be compiled or further processed to be understood by the processor in order to execute the instructions of the app program object. The app program object can then be stored in storage 112 for serving up by enterprise app server 102.

In typical operations, the endpoint device makes requests (not illustrated in FIG. 1) to the enterprise app server to download apps that the endpoint device can execute. The enterprise app server then serves the requested apps to the endpoint device, or at least toward the endpoint device. In a typical configuration, the stored apps stored in storage 112 for enterprise app server 102 are updated as desired by the enterprise. The enterprise app server and the enterprise API might be run by different entities or enterprises, but preferably when an app code update (or an entirely new app) object 114 is sent to enterprise app server 102 and stored for serving, if the app or updates result in changes to the operations of API calls made by the app, API change instructions 116 are also sent to enterprise API server 110. For example, if an app or an update to an app that is provided to enterprise app server 102 for serving includes a completely new protocol for a particular API call, preferably software at enterprise API server 110 is updated to deal with the new protocol.

In response to a request for an app program object, enterprise app server 102 outputs an app code object 118. App code object 118 could be in the form of an app that is executable by an endpoint device without modification that will issue API requests directly to enterprise API server 110 in a way that those requests will be understood by enterprise API server 110. As explained herein, providing the unmodified app code object 118 directly to any endpoint device that requests it might easily allow unauthorized third parties to reverse engineer the API that is being used, thereby allowing those unauthorized third parties to operate outside the intended uses of the app and its API.

Secure app update server 104 receives app code object 118 from enterprise app server 102 and transforms it, as described by examples herein, into a transformed app code object 119. Secure app update server 104 provides transformed app code object 119 to endpoint device 106. Upon execution of the app by endpoint device 106, the app will make API calls 120. Because of, or related to, the transformations made for transformed app code object 119, API calls in app code object 118 destined for enterprise API server 110 are instead directed towards secure API server 108.

Secure API server 108 converts API calls 120 into renormalized API requests 122, which secure API server 108 provides to enterprise API server 110. Enterprise API server 110 responds with API call responses. The conversion at secure API server 108 is done according to renormalization change instructions provided to secure API server 108. Preferably those instructions are such that a renormalized API request sent to enterprise API server 110 would be the same as, similar to, or a functional equivalent of, a corresponding API request that an endpoint device would have made if it were executing the untransformed app code object 118. As should be apparent from the above, the renormalization and the transformation should be coupled.

Where the secure API server and the enterprise API server communicate over a network path that is less accessible than the paths used by the endpoint devices, and where the secure app update server and the enterprise app server communicate over a network path that is less accessible than those paths used by the endpoint devices, the transformation of the app code provides some security benefits.

For example, suppose a typical time needed to reverse engineer and exploit an app's API is D days, that the app code object only changes every N*D days for some N>1, and that an unauthorized user can use the app and monitor network traffic around the app. Then, a typical reverse engineering could be effected and used against an API server for some time, at least until some change to the app code object renders the reverse engineering obsolete. In some cases, modifications to the app code object do not change the API used by the app code object, in which case, exploitations can continue. However, if the secure app update server changes the transform it uses for the app code objects it receives more frequently than every D days, and the network path(s) between the enterprise app server and the secure app update server is not as accessible to that unauthorized user, exploitation is made more difficult.

Other modifications beyond just program code for API calls and responses might be transformed, added, etc. as part of the transformation process. It is not mandatory that the app code object provided by the enterprise app server be totally unaware of the transformation process, and the app code object might include anti-tamper and/or anti-reverse engineering features distinct from API-based transformations. Security counter-measures might also include counter-measures designed to prevent abuse of mobile APIs and other APIs, general anti-reverse-engineering techniques, instrumentation to detect tampering, instrumentation to observe attempted malicious behavior, techniques to prevent operation by malicious applications coexistent on an endpoint device, and other security functions. New versions of the updated mobile app may be created as often as desired, and the secure API server may be configured to operate with some number of previous versions. For example, secure app update server 104 might change the transformed app code object it serves once per day, while the secure API server might respond to API calls from versions of the transformed app that are between 1 and 30 days old.

Responding to a range of versions is useful so that each endpoint device does not have to be in exact sync with all the other endpoint devices and the secure API server.

As an example, on June 1, the secure app update server might start serving version 3.0.1023 of the transformed app code object, change minor version numbers every hour, and end up serving version 3.2.9999 on June 30. Every endpoint device could re-download the latest transformed app code object each time the transformed app code object changes, but that might cause network congestion, race conditions and other undesirable effects. Instead, each endpoint device can re-download the transformed app code object when the app code object changes, or when convenient, or when the endpoint device is alerted to a change.

The secure API server, on July 1 might then support API calls from any endpoint's transformed app code object that has a version numbers between 3.0.1023 to 3.2.9999. The allowable range might be a sliding window, so that on July 3, endpoints that last downloaded the transformed app code object on June 1 would find that the secure API server will not process its API calls, but endpoints that last downloaded the transformed app code object on June 21 would be fine. Version numbers could be signaled explicitly, such as using a version field of an API call format, or implicitly by the way the API call is made. The open window for API calls might be by specific ranges (e.g., only versions 3.0.xxxx to 3.2.xxxx are supported) or by time ranges (e.g., only transformed app code objects downloaded between June 3 and July 3 are supported).

The particulars of the window are preferably known or determinable to the endpoint device, so that the endpoint device can refresh the transformed app code object to a supported version rather than waiting for API calls to fail. The range and/or size of the window may vary based on security considerations and/or conditions. For example, if a new critical vulnerability is discovered, the size of the window might be shortened to exclude all versions released before the critical vulnerability was discovered and fixed.

The responses of enterprise API server 110 to renormalized API requests 122 can be provided unchanged, or possibly routed through another proxy or node that further modifies the response before it gets to endpoint device 106. In other cases, the response to the API call is handled exactly as it would be if there were no secure API servers used. With this, an app can be secured even if the exact operations performed by that app are not known or well-understood.

Figure 2:
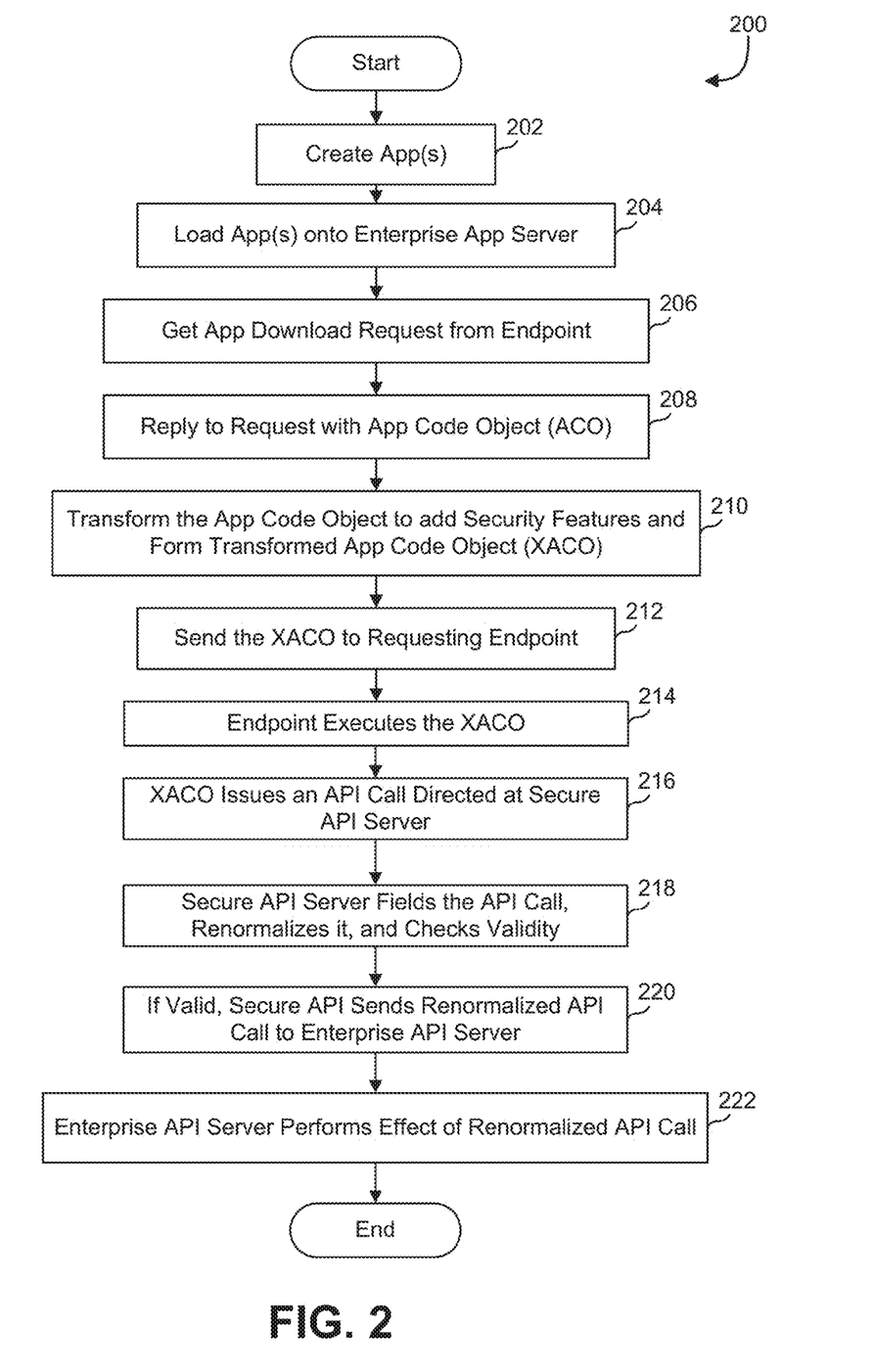
FIG. 2 is a flowchart of an example process for securing app usage.

FIG. 2 is a flowchart 200 of an example process for securing app usage. Once an enterprise creates apps (step 202), those apps are loaded onto an enterprise app server (step 204), which can be done in a conventional manner. While some security features could be built into apps before step 204, that is not required.

At step 206, the enterprise app server receives a request from an endpoint device (such as a mobile endpoint device or other client device) for a particular app. In some embodiments, the request goes directly to the enterprise app server, and in other embodiments, the request goes through a secure app update server. In yet other embodiments, app code objects are provided by the enterprise app server to the secure app update server in advance of any request for the app.

In step 208, the enterprise app server responds to the app request by providing the secure app update server with the app code object ("ACO"). Where the requests go to the secure app update server, the secure app update server responds to the request. At step 210, the secure app update server transforms the ACO into a transformed ACO ("XACO"), thereby adding security features to make it more difficult for unauthorized manipulation of the APIs used. The transformation of the ACO to the XACO might involve only changes to how the API operates, or might also include other changes, such as changes to the app that only alter internal operations of the app (non-API changes).

In some embodiments, where the app request goes to the secure app update server, the XACOs might be generated in advance and served as requested. For example, the secure app update server might obtain, from the enterprise app server, app code objects for a selected set of apps, updated from time to time or upon notice, transform them each into XACOs, all in advance of an app request. Additionally, the secure app update server might, as described elsewhere herein, generate a modified XACO more frequently than there are changes to the ACO.

In step 212, the XACO is sent to the requesting endpoint device. In operation at the endpoint device, the XACO preferably operates the same as, or similar to, how the ACO would operate if executed by the endpoint device, at least from the user's perspective.

As the endpoint device executes the XACO (step 214), it generates and issues API calls (step 216). Because of the transformation process, those generated API calls are not the same as the API calls that the ACO would have issued.

A secure API server fields the API call from the XACO (step 218), renormalizes it and checks for validity. If the XACO API call is not valid, the secure API server can drop it or take some other action. If the secure API server determines that the XACO API call is valid, it sends the renormalized API call to the enterprise API server (step 220) and the enterprise API server takes an appropriate action (step 222). If the renormalization of an XACO API call results in an API call as would have been made by the ACO, then the enterprise API server can serve responses to API calls without modifications needed to the enterprise API server. Typically, the secure API server would not notice non-API changes, but those changes can make reverse engineering of the API more difficult.

An API call may have parameters, flags, arguments, etc. Some of those parameters might include version numbers, user IDs, authentication fields, and the like. If version numbers are included, one such version number could be the version number of the XACO, that might allow the secure API server to perform a validity check on the XACO API call where the secure API server has recorded, or otherwise knows, which range of version numbers are currently valid.

An API call might be a request for data, a request to send data and/or a message, modification of data and/or state, etc. Thus, some reactions of the enterprise API server to receipt of an API call could be to respond with the requested data, an error message, or other status message. Some reactions to a particular API call might not involve any response to the endpoint device. Responses might be sent directly to the endpoint device from the enterprise API server or might be sent to the secure API server for some additional transformations before providing the response to the endpoint device.

In the example shown in FIG. 1, single instances of various elements are shown for clarity. However, in many implementations, there might be more than one instance of various elements.

Figure 3:
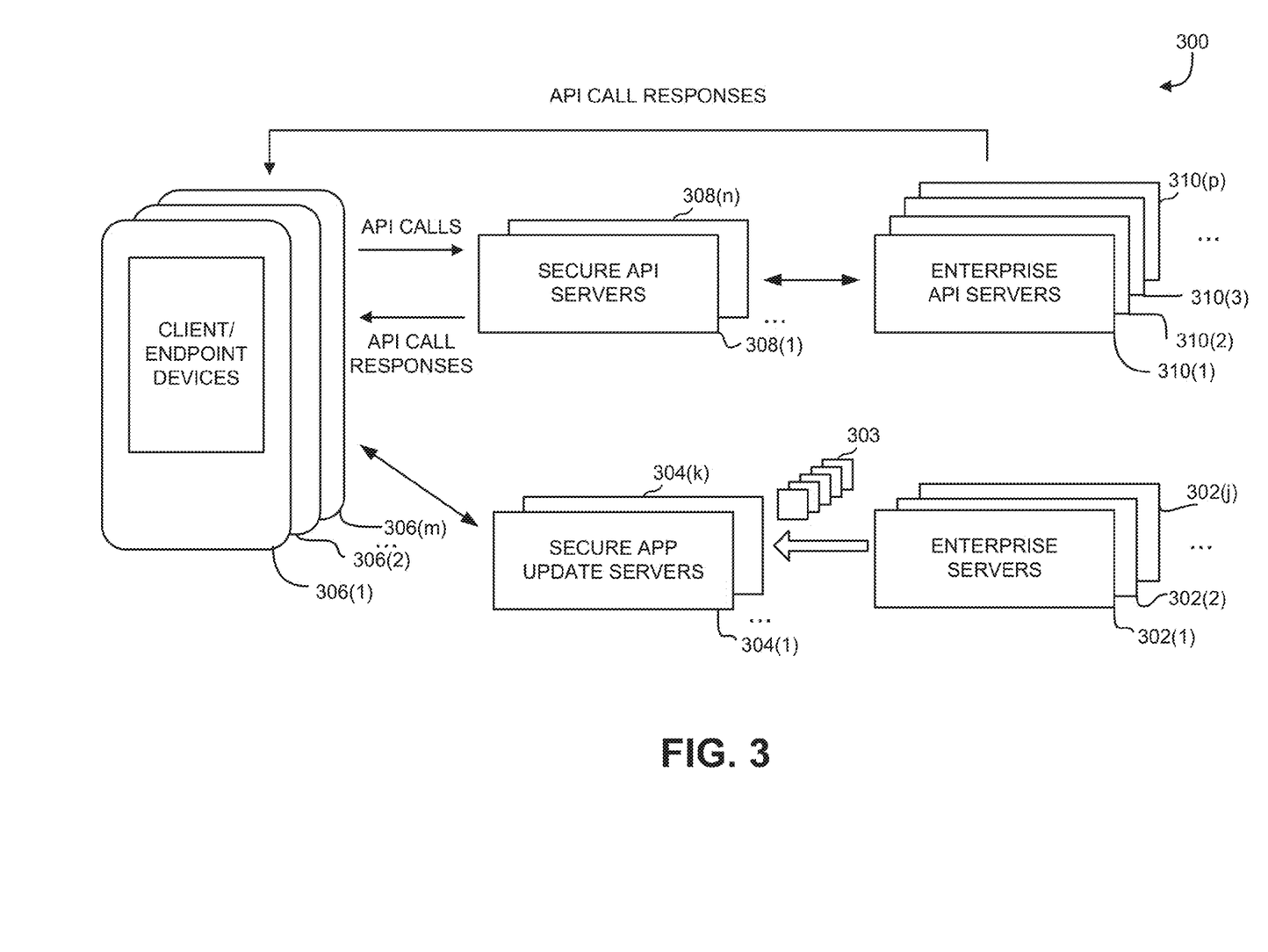
FIG. 3 illustrates a networked system having multiple instances of various elements.

FIG. 3 illustrates a networked system 300 having multiple instances of various elements, such as enterprise app servers 302(1) . . . (*j*) serving app code objects 303 to secure app update servers 304(1) . . . (*k*), which serve endpoint devices 306(1) . . . (*m*). Endpoint devices 306 issue API calls to, and may receive API call responses from, secure API servers 308(1) . . . (*n*), and secure API servers 308 communicate with enterprise API servers 310(1) . . . (*p*), which might send API call responses directly to endpoint devices 306 and/or to secure API servers 308. In FIG. 3, the labels in parentheses indicates a particular instance and it should be noted that j, k, m, n, and p might be any suitable integers greater than one. Also, in some embodiments, specific instances of one element deal with only one instance of another element, while in others, less correspondence is present. For example, it may be that n=k and each secure app update server is paired with one and exactly one secure API server. In other variations, there might be explicit pairs of secure API servers and secure app update servers, with each secure app update working with one or more enterprise app server and each secure API server working with one or more enterprise API server. Typically, there are many more endpoint devices than other elements.

In one arrangement, an enterprise operates their enterprise app servers and their API servers and by just routing a few pointers, a security service company can interpose their secure app update servers and secure API servers without requiring the enterprise to be configured to understand all the workings of the security service and without requiring the security service company to understand all the workings of the apps and APIs being protected.

Using these techniques and apparatus, attacking an explicit API by studying interactions to and from endpoint devices can be made more difficult and/or infeasible.

Figure 4:
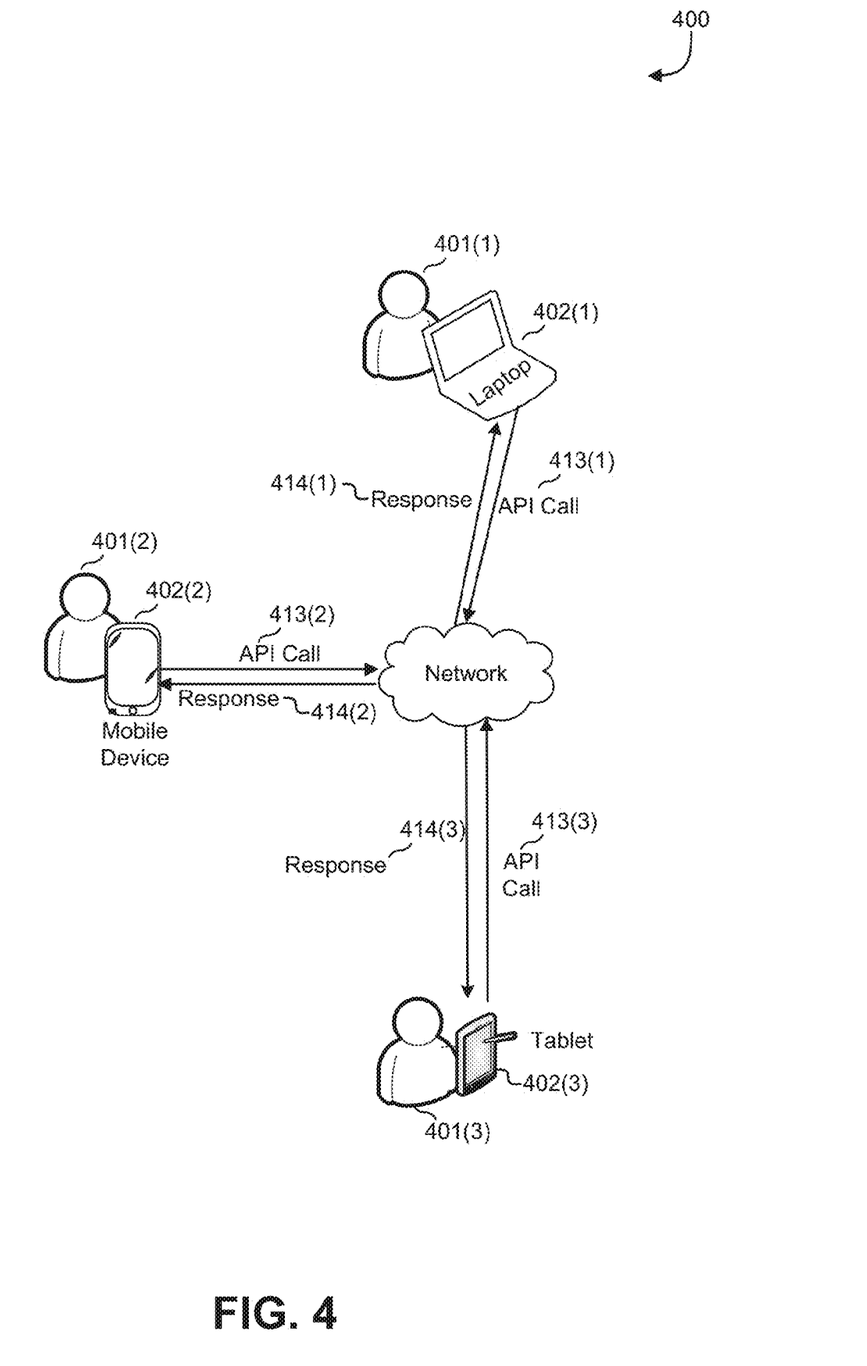
FIG. 4 illustrates some examples of endpoint devices.

FIG. 4 illustrates some examples of endpoint devices. As illustrated, a user 401 might use an endpoint device 402, such as a laptop 402(1), a mobile device 402(2), or a tablet computer 402(3) to execute apps that make API calls 413 to outside of the endpoint device and receive API call responses 414 from external sources. The sending and receiving of the API calls and responses might be over a network such as the Internet.

Figure 5:
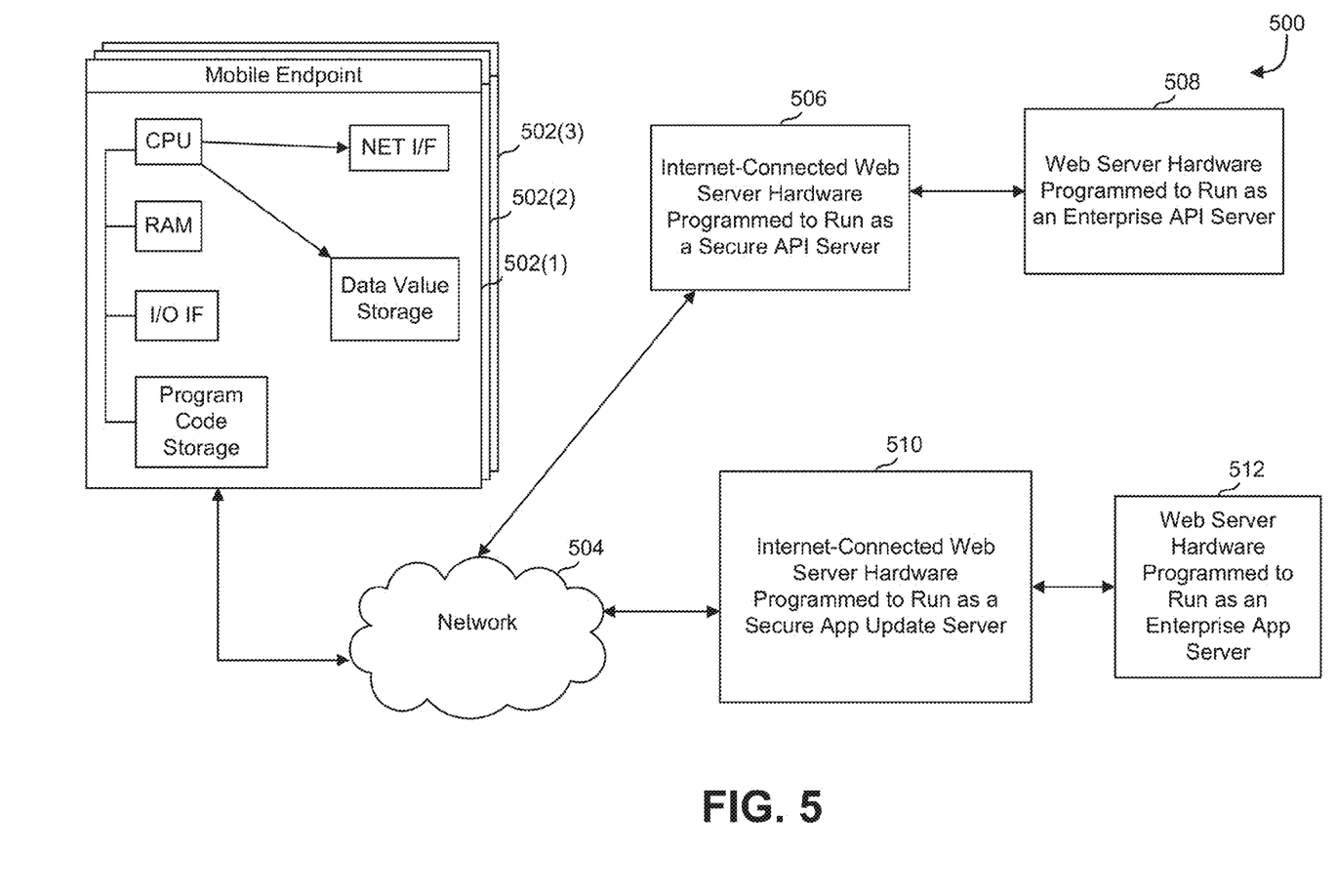
FIG. 5 illustrates an example of a hardware implementation of a networked app system.

FIG. 5 illustrates an example of a hardware implementation 500. As illustrated there, multiple user devices operate as mobile endpoints 502, coupled to a network 504. Over network 504, the mobile endpoints 502 can obtain apps over network 504 from a secure app update server 510 operating as a web server, which obtains the apps from other server hardware 512 that might also be Internet-connected. API calls can be fielded from mobile endpoints 502 via an Internet-connected web server hardware system 506 that operates as a secure API server and interfaces with hardware 508 that executes the enterprise API server functions.

A user device such as an endpoint device might include various components. For example, a user device might comprise a central processing unit ("CPU"), random access memory, storage for apps and data values used for making API calls and passing parameters and arguments, a network interface and an input/output interface. A system bus might connect the various components.

User devices might include a mobile telephone, a portable computer, a handheld tablet, and an embedded computing device that has network connectivity. In some cases, some selected API calls are made secure while other API calls interact over the network exactly like the corresponding calls would have done without the transforming.

Typically, the CPU is capable of processing instructions for execution that it reads from program code storage, which might be RAM, ROM, flash, magnetic storage, etc. The CPU may be designed using any of a number of architectures, such as a Complex Instruction Set Computer ("CISC") processor, a Reduced Instruction Set Computer ("RISC") processor, or a Minimal Instruction Set Computer ("MISC") processor. The CPU might be a single-threaded processor or a multi-threaded processor. Additional functionality might be provided by a graphics I/O system and processor.

In some implementations, the memory used is a computer-readable medium, such as a volatile memory unit or a non-volatile memory unit. Various storage devices might be capable of providing mass storage for various needs. For example, in one implementation, storage devices comprise flash drive devices, floppy disk devices, hard disk devices, optical disk devices, tape devices, or the like.

Input/output devices might include a keyboard and/or pointing device and a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device.

A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data. Storage devices suitable for tangibly embodying computer program instructions and data include many forms of non-volatile memory, including, by way of example, semiconductor memory devices, such as EPROM, EEPROM, and flash memory devices, magnetic disks such as internal hard disks and removable disks, magneto-optical disks; and CD-ROM and DVD-ROM disks.

The processor and the memory can be supplemented by, or incorporated in, ASICs (application-specific integrated circuits). To provide for interaction with a user, the features can be implemented on a computer having a display device such as a cathode ray tube ("CRT") monitor or liquid crystal display ("LCD") monitor for displaying information to the user and a keyboard and a pointing device such as a mouse or a trackball, or a touchscreen, by which the user can provide input to the computer. Additionally, such activities can be implemented via touchscreen flat panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by some form or medium of digital data communication such as a communication network. Examples of communication networks include a local-area network ("LAN"), a wide-area network ("WAN"), peer-to-peer networks (having ad-hoc or static members), grid computing infrastructures, and the Internet.

The computer hardware described herein might be used with the computer software described herein unless otherwise indicated. The software can be written in one or more languages and be stored in different forms of memory or storage. The computer hardware described and illustrated might include various forms of digital computers, such as laptops, desktops, workstations, personal digital assistants, servers, blade servers, mainframes, and other appropriate computers.

The user device might include mobile devices, such as personal digital assistants, cellular telephones, smartphones, and other similar computing devices. Additionally the system can include portable storage media, such as Universal Serial Bus ("USB") flash drives. For example, the USB flash drives may store operating systems and other applications. The USB flash drives can include input/output components, such as a wireless transmitter or USB connector that may be inserted into a USB port of another computing device.

The computer system can include clients and servers. A client and server are generally remote from each other and typically interact through a network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other implementations are within the scope of the following claims. Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Further embodiments can be envisioned to one of ordinary skill in the art after reading this disclosure. In other embodiments, combinations or sub-combinations can be advantageously made. The specification and figures are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A server system comprising:
   a secure app update server that transforms an app code object received from an enterprise app server into a transformed app code object, wherein the app code object includes application programming interface ("API") calls to an enterprise API server and wherein the transformed app code object includes API calls to a secure API server that operate differently than the API calls to the enterprise API server of the app code object, the secure app update server including a processor and memory; and
   the secure API server that interacts with an endpoint device that executes the transformed app code object, wherein the secure API server is adapted to convert API requests made by the transformed app code object into renormalized API requests formatted for processing by the enterprise API server, wherein the transforming of the app code object results in API requests from the endpoint device that would constitute invalid API requests if presented to the enterprise API server without renormalization.

2. The server system of claim 1, comprising additional secure app update servers and additional secure API servers.

3. The server system of claim 1, wherein the secure app update server and the secure API server serve a plurality of endpoint devices.

4. The server system of claim 1, further comprising interfaces to a plurality of enterprise app servers and interfaces to a plurality of enterprise API servers.

5. The server system of claim 1, wherein a first channel between the enterprise app server and the secure update app server is more secure and/or less accessible than a second channel between the secure update app server and the endpoint device.

6. The server system of claim 5, wherein a third channel between the endpoint device and the secure API server is less secure and/or more accessible than a fourth channel between the secure API server and the enterprise API server.

7. The server system of claim 1, wherein the endpoint device is a mobile device.

8. The server system of claim 7, wherein the mobile device is a smartphone.

9. The server system of claim 1, wherein the secure API server maintains a range of valid versions for the transformed app code object and selectively responds to API calls based on version numbers of the transformed app code objects making the API calls.

10. The server system of claim 1, wherein the transformed app code object comprises program modifications that create security measures other than API call related security measures.

11. The server system of claim 1, wherein the transformed app code object comprises permutations of API call details and permutations of internal app operations.

12. A method of securing a server system against unauthorized use and/or unauthorized operations of an application programming interface ("API") while allowing authorized operations using the API, the method comprising:
   providing an app code object from an enterprise app server to at least one secure app update server;
   transforming the app code object into a transformed app code object such that operation of at least one API call to an enterprise API server is obscured relative to the app code object;
   providing the transformed app code object to one or more endpoint device;
   receiving, at a secure API server, API requests made by the transformed app code object; and
   converting at least one of the received API requests made by the transformed app code object into a renormalized API request formatted for processing by an enterprise API server, wherein the transforming of the app code object results in API requests from the endpoint device that would constitute invalid API requests if presented to the enterprise API server without renormalization.

13. The method of claim 12, wherein the transforming is performed by the enterprise app server.

14. The method of claim 12, wherein the transforming is performed by the secure app update server.

15. The method of claim 12, further comprising:
   allocating app code objects to a plurality of secure app update servers; and
   associating each of a plurality of endpoint devices to one or more of the plurality of secure app update servers.

16. The method of claim 15, further comprising:
   associating each of the plurality of endpoint devices to one or more of a plurality of secure API servers; and
   allocating each of the plurality of secure API servers to one or more of a plurality of enterprise API servers.

17. The method of claim 12, wherein the endpoint device is a mobile device.

18. The method of claim 17, wherein the mobile device is a smartphone.

19. The method of claim 12, further comprising:
   maintaining, at the secure API server, an indication of a range of valid versions for the transformed app code object; and selectively responding to API calls from endpoint devices based on version indicators of transformed app code objects making the API calls.

20. The method of claim 12, wherein the transformed app code object comprises program modifications that create security measures other than API call related security measures.

* * * * *